United States Patent
Garavaglia et al.

(10) Patent No.: US 8,903,327 B2
(45) Date of Patent: Dec. 2, 2014

(54) CHANNEL QUALITY REPORTING USING A DYNAMICALLY ADJUSTED MEASUREMENT POWER OFFSET

(75) Inventors: Andrea Garavaglia, Nuremberg (DE); Long Duan, San Diego, CA (US); Jochen Hoidis, Nuremberg (DE); Amer Catovic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 13/234,059

(22) Filed: Sep. 15, 2011

(65) Prior Publication Data

US 2013/0072123 A1    Mar. 21, 2013

(51) Int. Cl.
*H04B 1/00* (2006.01)
*H04L 1/00* (2006.01)

(52) U.S. Cl.
CPC ............. *H04L 1/003* (2013.01); *H04L 1/0026* (2013.01); *H04L 1/0035* (2013.01)
USPC ........... 455/69; 455/522; 455/67.11; 370/252

(58) Field of Classification Search
CPC . H04W 52/146; H04W 52/241; H04W 52/58; H04W 52/08; H04W 52/34; H04W 52/04; H04W 52/10; H04W 52/247; H04W 52/248; H04W 52/265
USPC ......... 370/203, 204, 208, 216, 252, 280, 310, 370/312, 328–330, 332, 335, 341, 342, 345, 370/346, 348, 431; 375/140, 141, 213, 227, 375/240.27, 260, 262, 267, 324, 350; 455/11.1, 507, 226.3, 135, 226.1, 424, 455/425, 436, 452.1, 450, 517, 522, 69, 455/63.1, 67.11, 67.13
See application file for complete search history.

(56) References Cited

U.S. PATENT DOCUMENTS

| | | | |
|---|---|---|---|
| 2005/0186983 A1* | 8/2005 | Iochi ............................. | 455/522 |
| 2007/0177555 A1 | 8/2007 | Brueck et al. | |
| 2010/0029322 A1 | 2/2010 | Englund et al. | |
| 2010/0034315 A1 | 2/2010 | Khandekar et al. | |
| 2010/0103867 A1* | 4/2010 | Kishiyama et al. ........... | 370/320 |
| 2010/0135169 A1 | 6/2010 | Hu et al. | |
| 2010/0157829 A1* | 6/2010 | Jonsson et al. ................ | 370/252 |
| 2010/0265862 A1* | 10/2010 | Choi et al. ..................... | 370/311 |

OTHER PUBLICATIONS

3GPP (Mar. 2007), CQI definition when the UE is configured in MIMO mode, 3rd Generation Partnership Project, 3GPP TS 25.214 V7.4.0., Release 7, section 6A.2.2, 39-40. See Table 7A (p. 41).

(Continued)

*Primary Examiner* — Golam Sorowar

(57) ABSTRACT

Methods and apparatuses are provided for facilitating dynamic measurement power offset adjustments for use in reporting channel quality feedback. A user equipment may generate and send a plurality of channel quality indicator (CQI) values to a base station. The base station determines whether at least some of the received CQI values are outside of an upper or lower threshold value. If at least some of the received CQI values are outside the upper or lower threshold value, the base station can transmit an adjusted measurement power offset to the user equipment. On receipt of the adjusted measurement power offset, the user equipment generates subsequent CQI values using the adjusted measurement power offset.

16 Claims, 9 Drawing Sheets

(56) References Cited

OTHER PUBLICATIONS

Huawei et al: "Clarification of the CQI definition when the UE is configured in MIMO mode", 3GPP Draft; R1-105004 (R1-104743) 25214_CR0604R5_(REL9, A), 3rd Generation Partnership Project (3GPP), Mobile Competence Centre ; 650, Route Des Lucioles ; F-06921 Sophia-Antipolis Cedex ; France, vol. RAN WG1, no. Madrid, Spain; 20100823, Aug. 27, 2010, XP050450276, [retrieved on Aug. 27, 2010] Reason for Change 6A.2.2 CQI definition when the UE is configured in MIMO mode.
International Search Report and Written Opinion—PCT/US2012/055226—ISA/EPO—Nov. 19, 2012.

Qualcomm Europe et al: "CQI reporting for FDD MIMO", 3GPP Draft; R1-070571, 3rd Generation Partnership Project (3GPP), Mobile Competence Centre ; 650, Route Des Lucioles ; F-06921 Sophia-Antipolis Cedex ; France, vol. RAN WG1, no. Sorrento, Italy; 20070120, Jan. 20, 2007, XP050104592, [retrieved on Jan. 20, 2007] Introduction 6A.2 Channel quality inficator (CQI) definition.
Qualcomm Incorporated: "CQI reporting for MIMO UE's when the P-CPICH and S-CPICH have unequal power settings", 3GPP Draft; R1-103847_Impact Unequal CPICH Power MIMO, 3rd Generation Partnership Project (3GPP), Mobile Competence Centre ; 650, Route Des Lucioles ; F-06921 Sophia-Antipolis Cedex; France, vol. RAN WG1, no. Dresden, Germany; 20100628, Jun. 22, 2010, XP050449262,[retrieved on Jun. 22, 2010].

* cited by examiner

CHANNEL QUALITY REPORTING USING A DYNAMICALLY ADJUSTED MEASUREMENT POWER OFFSET

BACKGROUND

1. Field

Aspects of the present disclosure relate generally to wireless communication systems, and at least some aspects pertain more particularly to methods and devices for facilitating channel quality reporting using a dynamically adjusted measurement power offset.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

One such advancement includes channel quality feedback reported from user equipment in the form of a channel quality indicator (CQI) for use by the network in adapting modulation and coding, and for scheduling purposes in high speed data systems, such as High Speed Packet Access (HSPA) and Long Term Evolution (LTE) systems. Because conventional CQI calculations and specified reporting can result in reduced resolution and clipping, which may impact throughput performance, it would be beneficial to improve the conventional CQI calculations and reporting.

SUMMARY

Methods and apparatuses are provided for facilitating dynamic measurement power offset adjustments for use in reporting channel quality feedback. A user equipment may generate and transmit a plurality of channel quality indicator (CQI) values. A network entity may collect statistics corresponding to the received CQI from a particular UE or a group of UEs, so that these statistics may be utilized to determine whether clipping of the CQI values has occurred at the lower or upper boundary of the CQI reporting range. If at least some of the received CQI values show clipping (in some examples a configurable threshold may be used to evaluate the severity of the clipping), an adjusted measurement power offset may be sent to the UE. On receipt of the adjusted measurement power offset, the UE may generate subsequent CQI values using the adjusted measurement power offset in a conventional fashion, thus reducing or eliminating CQI clipping.

In one aspect, the disclosure provides a method of wireless communication, which includes receiving a plurality of channel quality indicator values from at least one user equipment, determining whether at least some of the plurality of received channel quality indicator values are at or above an upper threshold value, or at or below a lower threshold value, and transmitting an adjusted measurement power offset to the user equipment in response to at least some of the plurality of received channel quality indicator values being at or above the upper threshold value, or at or below the lower threshold value.

Another aspect of the disclosure provides an apparatus for wireless communication, which includes a transceiver adapted to facilitate wireless communication, a memory, and at least one processor coupled to the transceiver and to the memory. Here, the at least one processor adapted to receive a plurality of channel quality indicator values from at least one user equipment via the transceiver, to determine whether at least some of the plurality of received channel quality indicator values are at or above an upper threshold value, or at or below a lower threshold value, and to transmit an adjusted measurement power offset to the user equipment via the transceiver in response to at least some of the plurality of received channel quality indicator values being at or above the upper threshold value, or at or below the lower threshold value.

Another aspect of the disclosure provides a method of wireless communication, which includes transmitting a plurality of channel quality indicator values to a base station, receiving a transmission from the base station indicating a new measurement power offset in response to at least some of the plurality of channel quality indicator values transmitted to the base station being at or above an upper threshold value, or at or below a lower threshold value, and employing the new measurement power offset in determining a plurality of subsequent channel quality indicator values.

Another aspect of the disclosure provides an apparatus for wireless communication, which includes a transceiver adapted to facilitate wireless communication, a memory, and at least one processor coupled to the transceiver and to the memory. Here, the at least one processor adapted to transmit a plurality of channel quality indicator values to a base station via the transceiver, to receive, via the transceiver, a transmission from the base station indicating a new measurement power offset in response to at least some of the plurality of channel quality indicator values transmitted to the base station being at or above an upper threshold value, or at or below a lower threshold value, and to employ the new measurement power offset in determining a plurality of subsequent channel quality indicator values.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
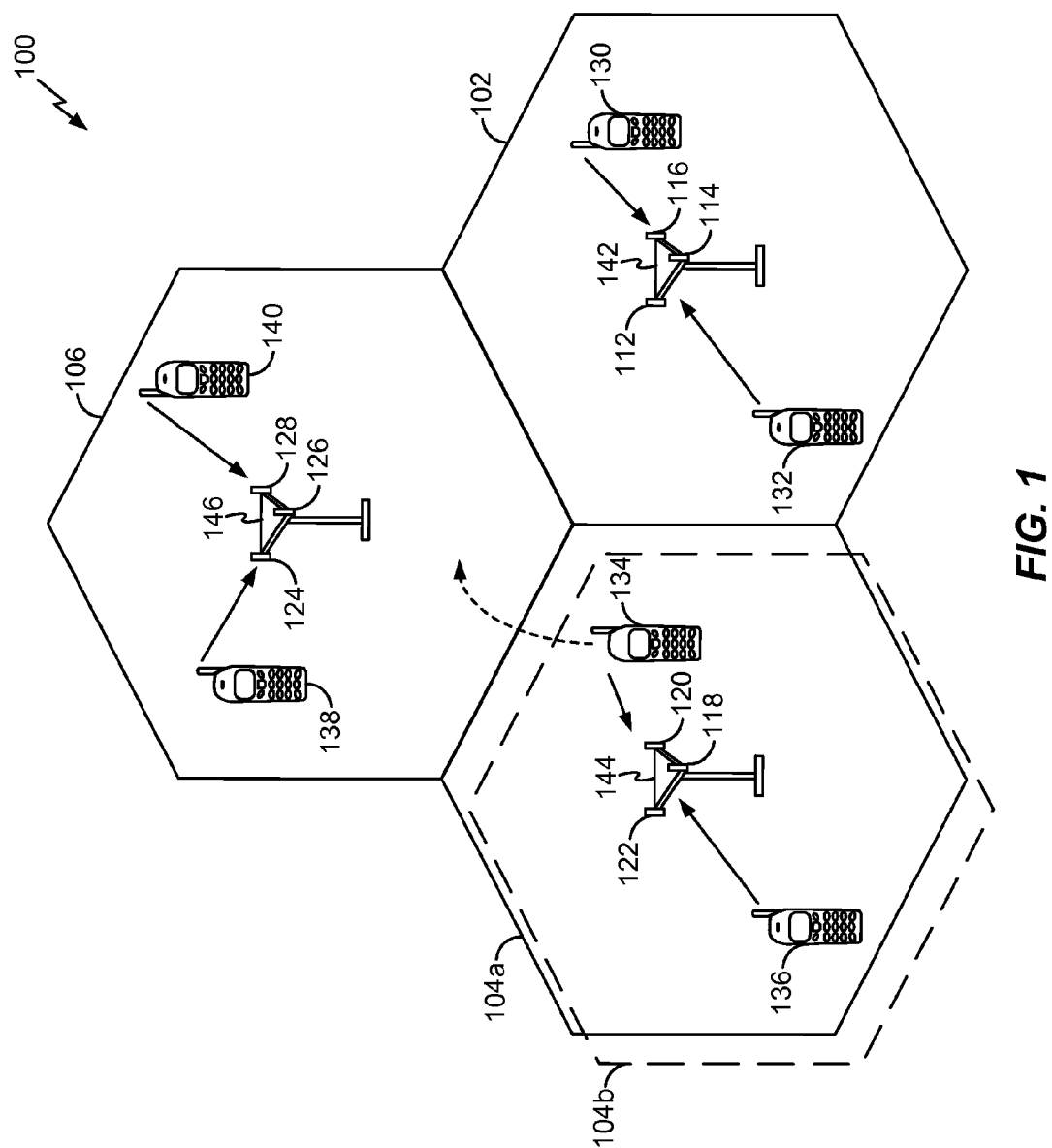
FIG. 1 is a conceptual diagram illustrating an example of an access network.

The various concepts presented throughout this disclosure may be implemented across a broad variety of telecommunication systems, network architectures, and communication standards. Referring to FIG. 1, by way of example and without limitation, a simplified access network 100 is illustrated. The access network 100 includes multiple cellular regions (cells), including cells 102, 104, and 106, each of which may include one or more sectors. Cells may be defined geographically, e.g., by coverage area, and/or may be defined in accordance with a frequency, scrambling code, etc. That is, the illustrated geographically-defined cells 102, 104, and 106 may each be further divided into a plurality of cells, e.g., by utilizing different scrambling codes. For example, cell 104*a* may utilize a first scrambling code, and cell 104*b*, while in the same geographic region and served by the same Node B 144, may be distinguished by utilizing a second scrambling code.

In a cell that is divided into sectors, the multiple sectors within a cell can be formed by groups of antennas with each antenna responsible for communication with one or more user equipment (UE) in a portion of the cell. For example, in cell 102, antenna groups 112, 114, and 116 may each correspond to a different sector. In cell 104, antenna groups 118, 120, and 122 each correspond to a different sector. In cell 106, antenna groups 124, 126, and 128 each correspond to a different sector.

The cells 102, 104 and 106 may include several UEs that may be in communication with one or more sectors of each cell 102, 104 or 106. For example, UEs 130 and 132 may be in communication with a base station 142, of cell 102, UEs 134 and 136 may be in communication with the base station 144 of cell 104, and UEs 138 and 140 may be in communication with the base station 146 of cell 106. Here, each base station 142, 144, 146 is configured to provide an access point to a core network 204 (see FIG. 2) for all the UEs 130, 132, 134, 136, 138, 140 in the respective cells 102, 104, and 106.

Figure 2:
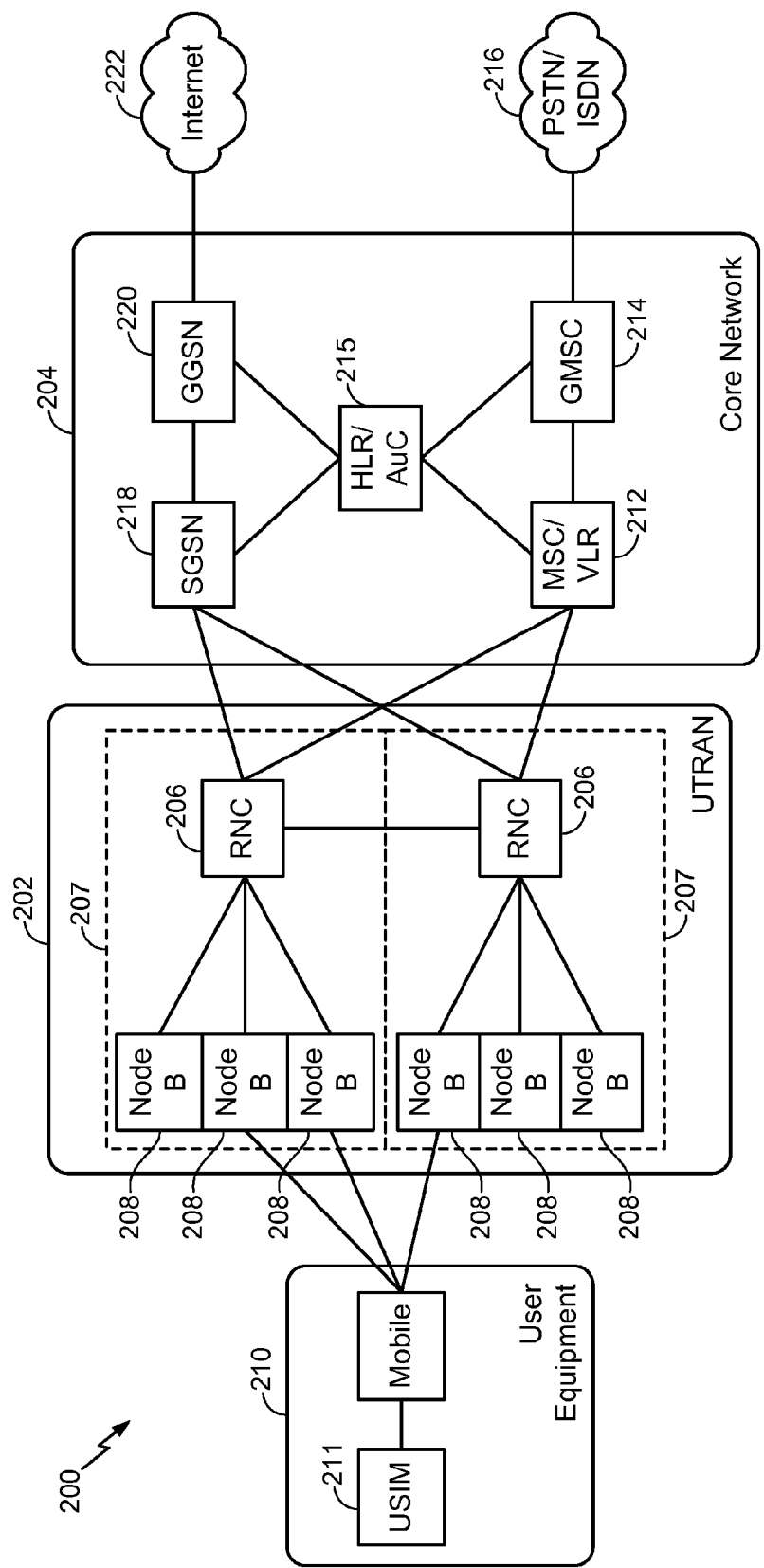
FIG. 2 is a block diagram conceptually illustrating an example of a telecommunications system.

Referring now to FIG. 2, a block diagram is shown by way of example and without limitation, illustrating select components of an access network (such as the access network 100 of FIG. 1) implemented as a Universal Mobile Telecommunications System (UMTS) system 200 employing a W-CDMA air interface. A UMTS network generally includes three interacting domains: a Core Network (CN) 204, a UMTS Terrestrial Radio Access Network (UTRAN) 202, and User Equipment (UE) 210. In this example, the UTRAN 202 may provide various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207, which may vary from the illustrated RNCs 206 and RNSs 207. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) 210 in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The core network 204 interfaces with one or more access networks, such as the UTRAN 202. As shown, the core network 204 is a GSM core network. However, as those skilled in the art will recognize, the various concepts presented throughout this disclosure may be implemented in a RAN, or other suitable access network, to provide UEs with access to types of core networks other than GSM networks.

The illustrated GSM core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UMTS air interface may be a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface.

Figure 3:
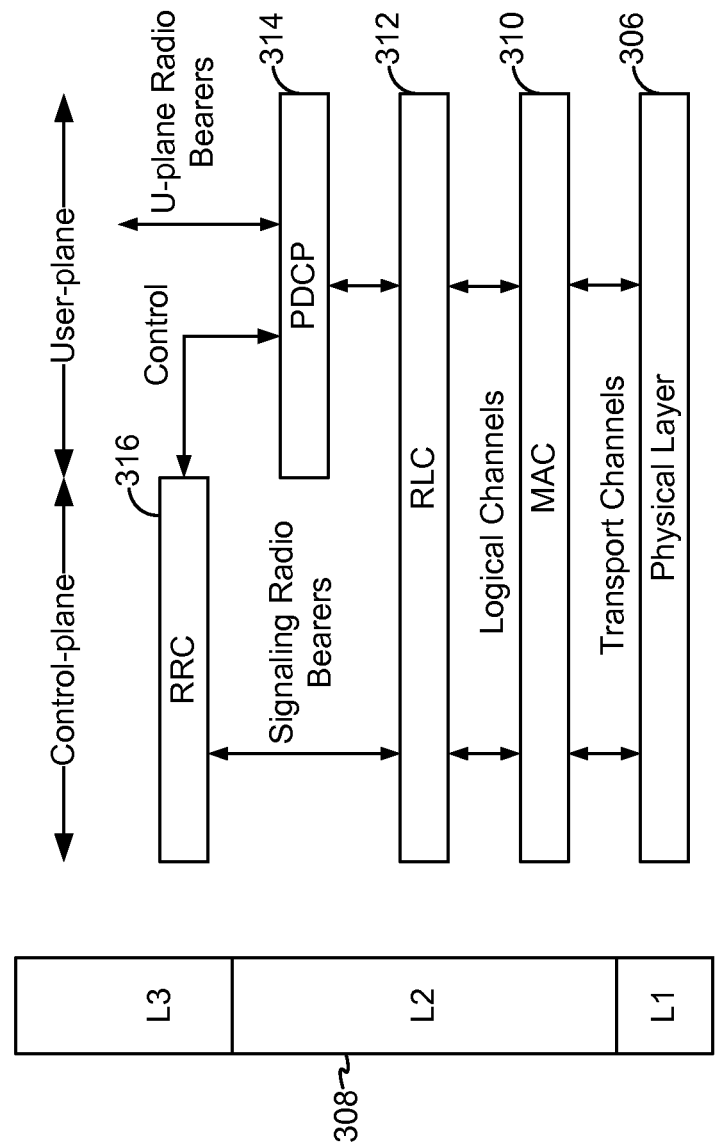
FIG. 3 is a conceptual diagram illustrating an example of a radio protocol architecture for the user and control plane.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. FIG. 3 is a block diagram illustrating an example of a radio protocol architecture for user and control planes between the user equipment (UE) 210 and the Node B 208. Here, the user plane or data plane carries user traffic, while the control plane carries control information, i.e., signaling.

With reference to FIGS. 2 and 3, the radio protocol architecture for the UE 210 and Node B 208 is shown with three layers: Layer 1 (L1), Layer 2 (L2), and Layer 3 (L3). Layer 1 is the lowest layer and implements various physical layer signal processing functions. Layer 1 will be referred to herein as the physical layer 306. The data link layer, called Layer 2 (or "the L2 layer") 308 is above the physical layer 306 and is responsible for the link between the UE 210 and Node B 208 over the physical layer 306.

At Layer 3, the RRC layer 316 handles the control plane signaling between the UE 210 and the Node B 208. RRC layer 316 includes a number of functional entities for routing higher layer messages, handling broadcast and paging functions, establishing and configuring radio bearers, etc.

In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Although not shown, the UE 210 may have several upper layers above the L2 layer 308 including a network layer (e.g., IP layer) that is terminated at a PDN gateway on the network side, and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs 210 between Node Bs 208.

The RLC sublayer 312 provides segmentation and reassembly of upper layer data packets, retransmission of lost data packets, and reordering of data packets to compensate for out-of-order reception due to a hybrid automatic repeat request (HARQ).

The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations.

A high speed packet access (HSPA) air interface implemented in a system such as the system illustrated in FIG. 2 includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

An HSDPA network may utilize as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ acknowledgement (ACK) and/or negative acknowledgement (NACK) signaling on the uplink to indicate whether a corresponding packet transmission was decoded successfully. That is, with respect to the downlink, the UE 210 provides feedback to the Node B 208 over the HS-DPCCH to indicate whether it correctly decoded a packet on the downlink.

The HS-DPCCH may further be employed by the UE 210 for transmitting feedback signaling to assist the Node B 408 in making decisions regarding modulation and coding schemes and precoding weight selection. For example, in at least some implementations, the UE 210 can monitor and perform measurements of certain parameters of the downlink channel to determine the quality of that channel. Based on these measurements the UE 210 can provide feedback to the Node B 208 on an uplink transmission using the HS-DPCCH. This feedback can include a channel quality indicator (CQI). The channel quality indicator (CQI) is generally calculated at the UE 210 based on the signal-to-noise ratio of a received common pilot. The CQI may be interpreted as a recommended transport-block size, taking into account the particular UE's receiver performance. That is, the CQI relates to estimates the number of bits that can be transmitted on the downlink to the UE 210 using a certain assumed power with a block error rate of 10%, and provides the Node B 208 with a measure of the UE's 210 perceived channel quality in combination with the UE's receiver performance.

The CQI typically takes an integer value between 1 and 30, with 1 indicating the lowest channel quality and 30 indicating the highest channel quality, as set forth in the $3^{rd}$ Generation Partnership Project, Technical Specification Group Radio Access Network, 3GPP TS 25.214 section 6A.2. The UE calculates the CQI with the assumption that the total received power on the HS-PDSCH is defined by the equation $P_{HSPDSCH} = P_{CPICH} + \Gamma + \Delta$ (dB), where $P_{CPICH}$ is typically the received power of the P-CPICH, $\Gamma$ is the measurement power offset, and $\Delta$ is the reference power adjustment given by tables included in the technical specification.

A network node such as the RNC 206 receives the CQI and may employ the reported CQI measurements to adapt modulation and coding for future transmissions from the Node B 208 to the corresponding UE 210, as well as for scheduling algorithms. Of course, those skilled in the art will understand any suitable network node may perform the processing of the received CQI measurements, including the RNC 206, a base station (such as an eNode B in an E-UTRA network), etc. For example, the network may process the reported CQI into a channel quality estimate according to the equation $ChQual = CQI - (P_{CPICH} + \Gamma)$. This channel quality estimate can be used in transport format resource combination (TFRC) selection. Thus, the network may provide subsequent MAC-hs/MAC-ehs packets to the UE 210 on downlink transmissions having a size, coding format, etc., based on the reported CQI from the UE 210.

As seen, both the UE 210 and the network employ the measurement power offset ($\Gamma$) in calculations relating to the sent or received CQI values. The measurement power offset is conventionally signaled at call setup and typically remains unchanged unless a transport channel reconfiguration procedure is performed. In general, because the UE 210 does not know the actual power level employed by the Node B 208 for transmitting to the UE 210, the UE 210 employs this semi-static measurement power offset supplied by the network when calculating the CQI. If the measurement power offset value is too low, the UE 210 will assume a very low HS-PDSCH power and will typically report CQI values in the lower end of the CQI reporting range, which may result in a loss of dynamic range. Similarly, if the measurement power offset value is too high, the UE 210 will assume a very high HS-PDSCH power and will typically use the higher end of the CQI reporting range. In many instances, these skewed values can be overcome by the network by making the necessary adjustments to the CQI, since the Node B 208 is aware of both the measurement power offset value employed by the UE 210 and the actual power level employed to transmit to the UE 210.

In some instances, a potential problem may arise in situations in which the CQI value would actually fall outside of the CQI reporting range (1-30). For example, if the measurement power offset value is too low, the UE 210 may calculate a channel quality that would correspond more closely to a CQI that would fall below the lowest allowable CQI value of 1 (e.g., 0, -1, -2, etc.). Similarly, if the measurement power offset value is too high, the UE 210 may calculate a channel quality that would correspond more closely to a CQI that would fall above the highest allowable CQI value of 30 (e.g., 31, 32, 33, etc.). It may be said that the CQI values are "clipped" in these cases, since the UE 210 cannot report a CQI lower than 1 or higher than 30. In such instances, the Node B 208 cannot make the complete adjustments to overcome the differences between the measurement power offset value and the actual power value, because the Node B 208 does not know what the true CQI value is (e.g., below 1 or above 30). Various implementations of the present disclosure relate to devices and methods for adjusting the measurement power offset value in order to avoid or even eliminate CQI clipping.

Figure 4:
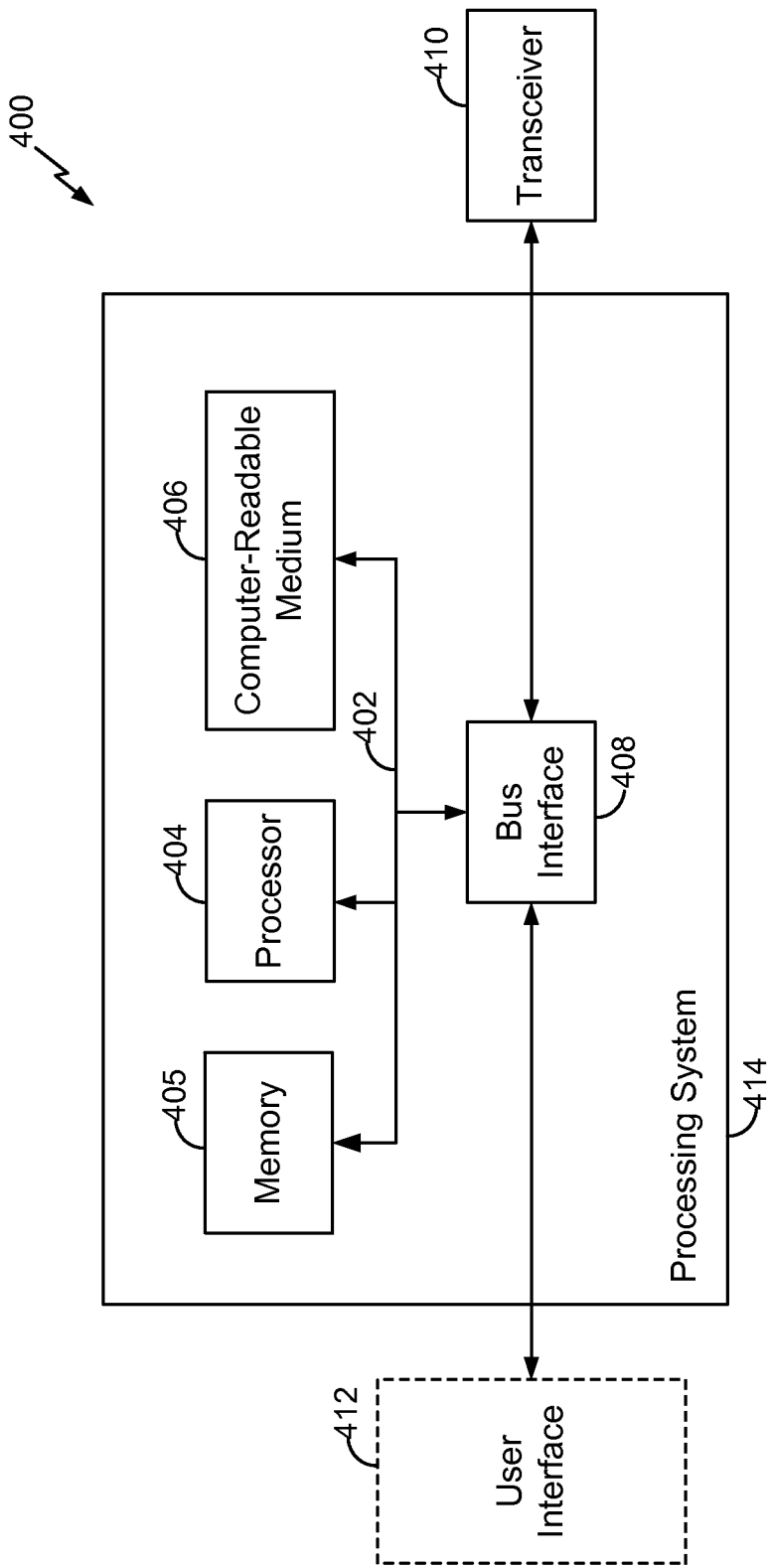
FIG. 4 is a block diagram illustrating an example of a hardware implementation for an apparatus employing a processing system.

In accordance with various aspects of this disclosure, an element, or any portion of an element, or any combination of elements may be implemented with a "processing system" that includes one or more processors. FIG. 4 is a block diagram illustrating an example of a hardware implementation for an apparatus 400 employing a processing system 414. Such an apparatus 400 may be employed as a user equipment (such as UE 210 in FIG. 2) and/or a Node B (such as Node B 208 in FIG. 2), according to at least some embodiments of the present disclosure. In the example illustrated in FIG. 4, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors, represented generally by the processor 404, a memory 405, and computer-readable media, represented generally by the computer-readable medium 406. The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a means for communicating with various other apparatus over a transmission medium. For example, the transceiver 410 can be adapted to facilitate wireless communications with one or more other devices. In such cases, the transceiver 410 can include transmitter and/or receiver chains. Depending upon the nature of the apparatus, a user interface 412 (e.g., keypad, display, speaker, microphone, joystick) may also be provided.

According to one or more embodiments, the processor 404 may include one or more microprocessors, microcontrollers, digital signal processors (DSPs), field programmable gate arrays (FPGAs), programmable logic devices (PLDs), state machines, gated logic, discrete hardware circuits, and/or other suitable hardware configured to perform the various functionality described throughout this disclosure. The processor 404 is responsible for managing the bus 402 and general processing, including the execution of software stored on the computer-readable medium 406. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The computer-readable medium 406 may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium 406 may also include, by way of example, a carrier wave, a transmission line, and any other suitable medium for transmitting software and/or instructions that may be accessed and read by a computer. The computer-readable medium 406 may be resident in the processing system 414, external to the processing system 414, or distributed across multiple entities including the processing system 414. The computer-readable medium 406 may be embodied in a computer-program product. By way of example, a computer-program product may include a computer-readable medium 406 in packaging materials. Those skilled in the art will recognize how best to implement the described functionality presented throughout this disclosure depending on the particular application and the overall design constraints imposed on the overall system.

The software, when executed by the processor 404, causes the processing system 414 to perform the various functions and/or process steps described herein for any particular apparatus. The computer-readable medium 406 may also be used for storing data that is manipulated by the processor 404 when executing software. Thus, according to one or more aspects of the present disclosure, the processor 404 may be adapted to perform any or all of the processes, functions, steps and/or routines related to any of the UEs and/or Node Bs described herein. As used herein, the term "adapted" in relation to the processor 404 may refer to the processor 404 being one or more of configured, employed, implemented, or programmed to perform a particular process, function, step and/or routine according to various features described herein.

Figure 5:
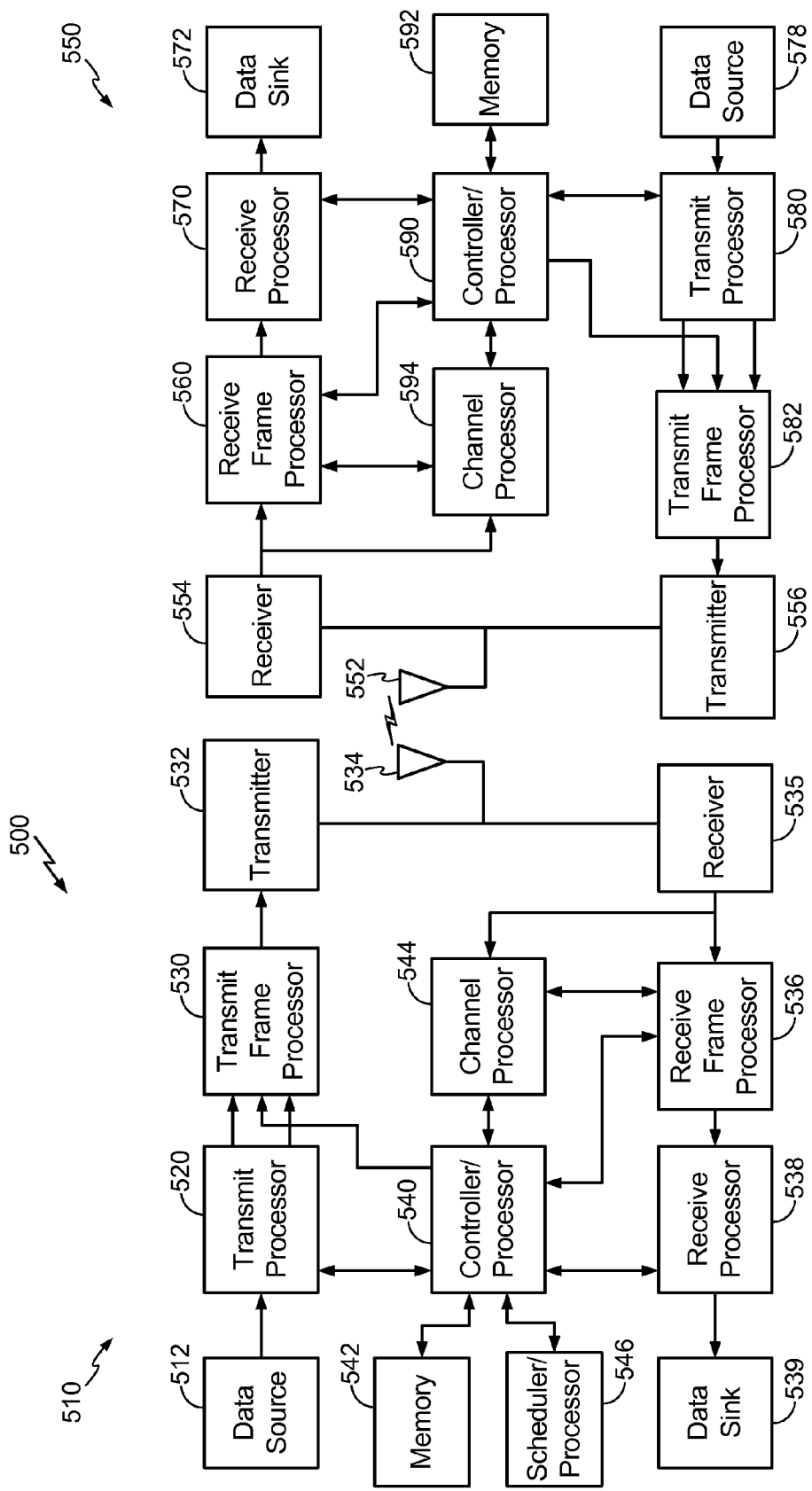
FIG. 5 is a block diagram conceptually illustrating an example of a Node B in communication with a UE in a telecommunications system.

Turning to FIG. 5, a block diagram is shown illustrating more detailed examples of two processing systems (e.g., processing systems 414 of FIG. 4) implemented as a base station 510 and a UE 550. In the depicted example, the base station 510 is in communication with the UE 550, where the base station 510 may be the Node B 208 in FIG. 2, and the UE 550 may be the UE 210 in FIG. 2. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback (e.g., CQI values) from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the base station 510. More specifically, the receive processor 570 descrambles and despreads the symbols, and then determines the most likely signal constellation points transmitted by the base station 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the base station 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the base station 510 or from feedback contained in the midamble transmitted by the base station 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the base station 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the base station 510 and the UE 550, respectively. For example, the controller/processors 540 and 590 may provide various functions including timing, peripheral interfaces, voltage regulation, power management, and other control functions. The computer readable media of memories 542 and 592 may store data and software for the base station 510 and the UE 550, respectively. A scheduler/processor 546 at the base station 510 may be used to allocate resources to the UEs and schedule downlink and/or uplink transmissions for the UEs.

According to at least one feature, the controller/processor 590 of the UE 550 can be adapted to generate channel quality indicator (CQI) values using channel information from the channel processor 594. For example, the channel processor 594 can provide information to the controller/processor 590 for calculating the CQI values according to a CQI algorithm, such as the algorithm noted herein above (i.e., $P_{HSPDSCH}=P_{CPICH}+\Gamma+\Delta$, in dB). The CQI can then be transmitted to the base station 510 as an uplink transmission as set forth herein above. On receipt of the CQI transmission at the base station 510, the controller/processor 540 can determine whether the measurement power offset employed at the UE 550 for calculating the CQI should be adjusted.

Figure 6:
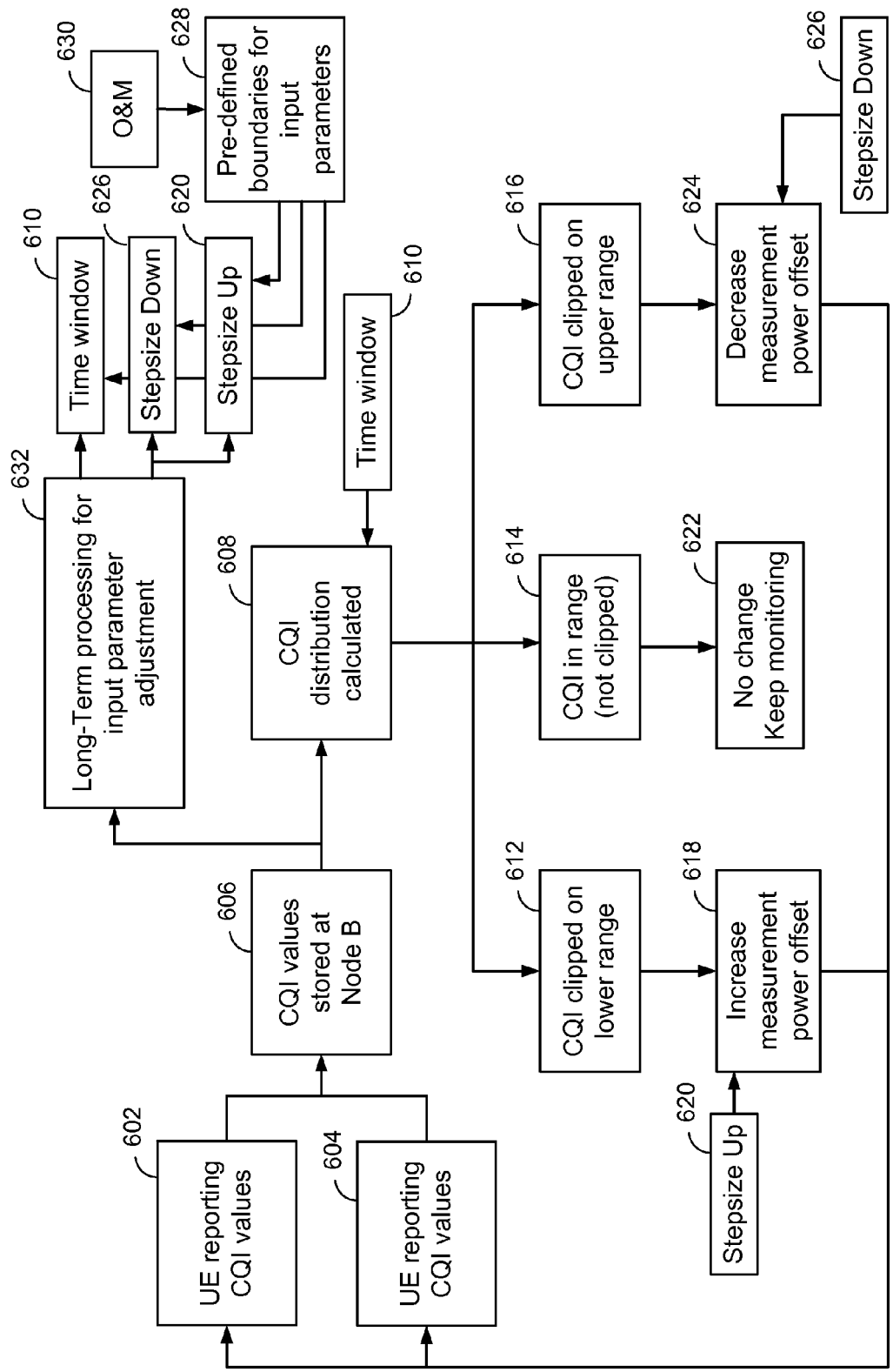
FIG. 6 is a flow diagram illustrating an operation for adjusting the measurement power offset according to at least one implementation.

According to one or more aspects, a network node such as the RNC 206 or the base station 510 is adapted to receive and analyze a plurality of channel quality indicator (CQI) values from the UE 550 to determine whether at least some of the plurality of received CQI values are outside one of an upper threshold value or a lower threshold value, and to adjust the measurement power offset if desirable. FIG. 6 is a flow diagram illustrating an operation for adjusting the measurement power offset according to at least one implementation. As shown, one or more UEs 602, 604 report CQI values to a network node, and the CQI values can be stored 606 by the network node. These stored CQI values are employed at the network node to calculate a CQI distribution 608. For example, the CQI values can be employed to calculate a histogram for all the CQI values received during a predetermined time window 610. Here, the histogram may include the combined CQI values transmitted by a plurality of UEs, up to all of the UEs served by a particular sector or cell; or the histogram may only include the CQI values transmitted by a particular UE.

Using the CQI distribution, the network node can determine whether one or more CQI values are clipped on a lower end of the CQI range 612, within the CQI range (e.g., not clipped) 614, or clipped on an upper end of the CQI range 616. If one or more CQI values are clipped on a lower range 612, the network node can increase the measurement power offset 618, and the new measurement power offset value can be sent to one or all of the UEs 602, 604. The amount the measurement power offset is increased may be indicated by a predefined stepsize up 620. If the CQI values are at least substantially within a predetermined range (e.g., not clipped) 614, the network node may make no changes to the measurement power offset and can continue monitoring the CQI values 622. If one or more CQI values are clipped on an upper range 616, the network node can decrease the measurement power offset 624, and the new measurement power offset value can be sent to one or all of the UEs 602, 604. The amount the measurement power offset is decreased may be indicated by a predefined stepsize down 626.

The time window parameter 610, stepsize up parameter 620, and stepsize down parameter 626 may initially be predefined 628 by an operations and management (O&M) entity 630. Over the course of operations, the network node may employ the received CQI values 606 to perform processes 632 for adjusting and fine tuning these input parameters 610, 620, 626.

Figure 7:
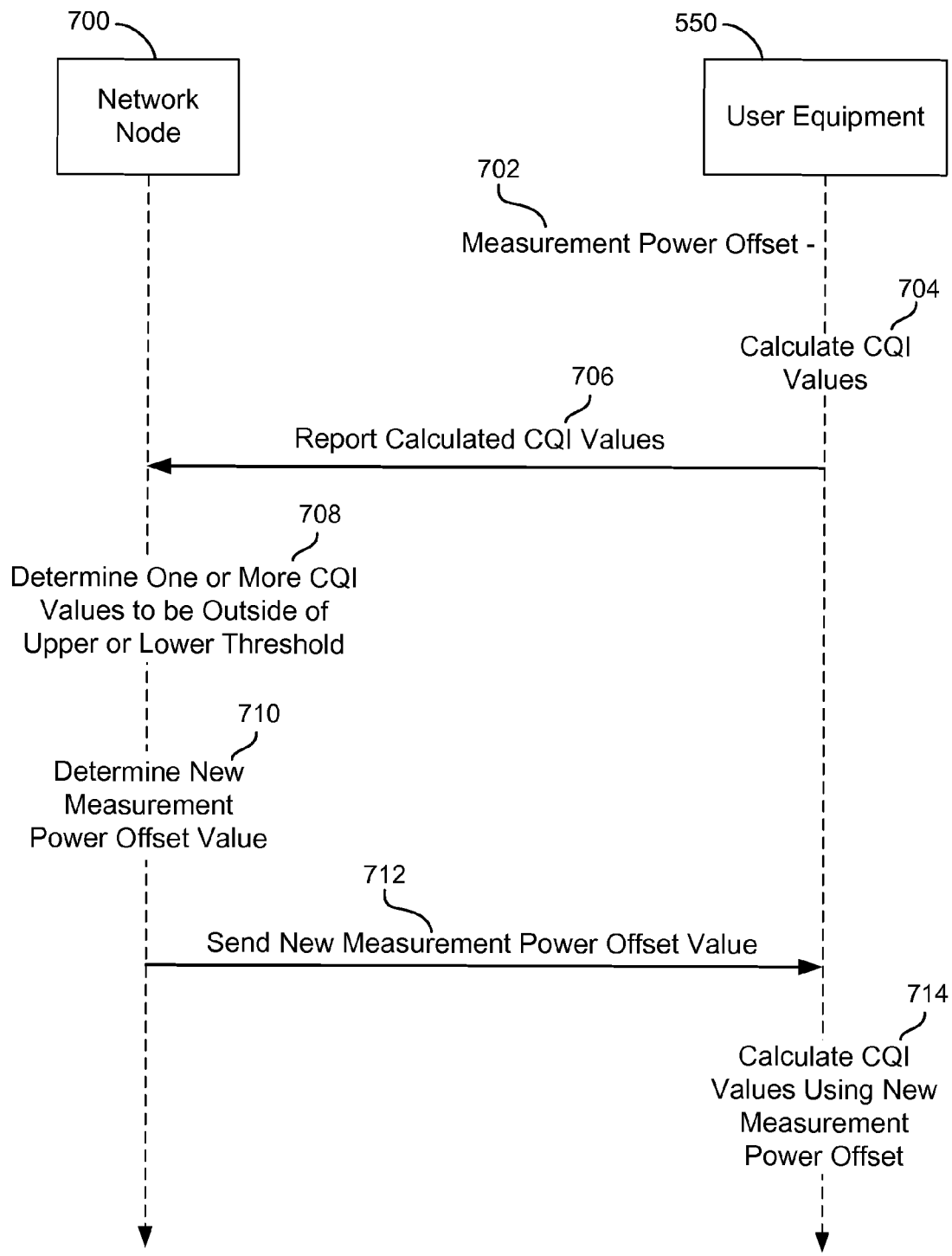
FIG. 7 is a flow diagram illustrating an example of at least some of the interactions between a Node B and a UE in a measurement power offset adjustment operation according to at least one implementation.

Turning to FIG. 7, a flow diagram is shown illustrating an example of at least some of the interactions between a network node 700 and a UE 550 in a measurement power offset adjustment operation according to at least one implementation. In various aspects of the disclosure, the network node 700 may be the base station 510 (e.g., a Node B or an eNode B), the RNC 206, or any suitable node in the radio access network or core network for performing the recited functions. Initially, the UE 550 can be provided with a measurement power offset 702. This initial measurement power offset may be signaled, for example, at call setup, or may include an adjusted measurement power offset signaled as an RRC message, such as part of a transport channel reconfiguration procedure, a radio bearer reconfiguration procedure, or any other method for providing a measurement power offset to the UE 550 for use in estimating the power level employed by the network node 700 when sending transmissions to the UE 550. Use of the term "initial" in referring to this measurement power offset should not be interpreted as the measurement power offset being the first. Instead, the term "initial" is intended to denote that this measurement power offset precedes the new measurement power offset described below. Using this measurement power offset, the UE 550 can calculate one or more CQI values at 704. Each of the one or more calculated CQI values are reported to the network node 700 at 706.

Upon receipt of the one or more CQI values, the network node 700 determines whether at least some of the CQI values are outside of either an upper threshold value or a lower threshold value 708. For example, an upper threshold value may be set to some value (e.g., 28, or the upper limit value, 30, etc.), and the network node 700 may determine whether one or more CQI values are at or above the threshold. In some implementations, the network node 700 may generate a distribution of the received CQI values over the course of a predetermined period of time (e.g., a histogram). For instance, such a distribution may be generated for CQI values received over a period of time equal to a network counter interval (e.g., typically 15 minutes or 1 hour), as well as shorter or longer according to a designer's preference. In instances where the network node 700 generates a distribution of the CQI values, the network node 700 can evaluate the distribution (e.g., the histogram) to determine, e.g., whether a particular number of CQI values are at the upper or lower limit, or outside of the upper or lower threshold values. For example, a distribution showing CQI values rising until a spike in the distribution, or a plurality of subsequent CQI values are reported at the maximum (e.g., 30) may indicate that the CQI values are being clipped on the upper end and that the measurement power offset should be reduced. On the other hand, a distribution showing CQI values falling until a spike in the distribution, or a plurality of subsequent CQI values are reported at the minimum (e.g., 1) may indicate that the CQI values are being clipped on the lower end and that the measurement power offset should be increased.

If a characteristic of the CQI distribution indicates clipping, or if some predetermined number of CQI values are above the upper threshold or below the lower threshold, the network node 700 can determine a new measurement power offset value 710. For example, if a predetermined number of CQI values (e.g., one or more) are above the upper threshold, a new measurement power offset that is lower than the initial (or preceding) measurement power offset may be selected so that subsequently reported CQI values can form a more centralized distribution. The new measurement power offset value 712 may be transmitted to the UE 550. After receiving the new measurement power offset, the UE 550 employs the new measurement power offset in calculating subsequent CQI values 714 to be reported. This process can repeat indefinitely so that the measurement power offset is continually refined to reduce or even eliminate clipping of CQI values reported by UEs 550.

Figure 8:
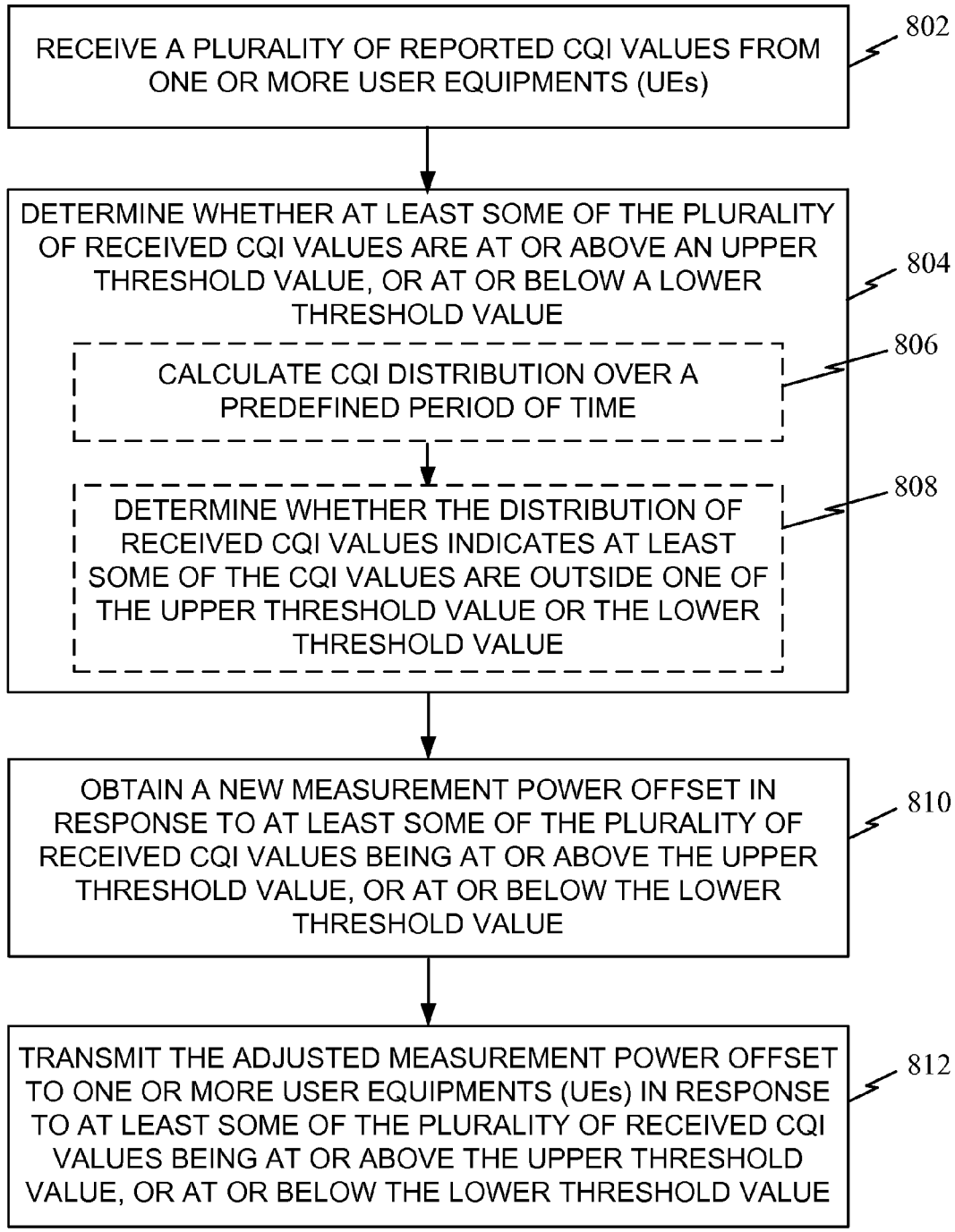
FIG. 8 is a flow diagram illustrating a method operational on a base station for facilitating measurement power offset adjustments in response to CQI values according to at least one implementation.

FIG. 8 is a flow diagram illustrating a method operational on a network node such as an RNC 206 or a base station 510 (e.g., a Node B or an eNode B), for facilitating measurement power offset adjustments in response to CQI values according to at least one implementation. With reference to both of FIGS. 5 and 8, the network node can receive a plurality of reported CQI values from one or more UEs at step 802. For instance, the receiver 535 of the base station 510 can receive a plurality of uplink transmissions through the antenna 534, and can provide the recovered CQI value from each transmission to the receive frame processor 536. The receive frame processor 536 can parse each frame and provide the CQI signals to the receive processor 538, where they are processed and provided to the controller/processor 540.

According to various implementations, each of the received CQI values can be stored in a memory, such as the memory 542. The CQI values can be collected according to various criteria. For example, the CQI values can be collected all together for each individual cell, or the CQI values can be grouped according to UE type, model, category, or per user, for obtaining a finer and more precise control of the measurement power offset parameter at each UE.

At step 804, the network node determines whether at least some of the plurality of received CQI values are at or above an upper threshold value, or at or below a lower threshold value. For example, the controller/processor 540 of the base station 510 can analyze the plurality of received CQI values to determine whether at least some of the CQI values are at or above the upper threshold value, or at or below the lower threshold value. In at least some implementations, the controller/processor 540 may calculate a CQI distribution over a predefined period of time, as indicated at step 806. For instance, the controller/processor 540 may generate a histogram based on the received CQI values over the particular period of time. The controller/processor 540 can then determine whether a characteristic of the distribution of received CQI values indicates that at least some of the CQI values are outside one of the upper threshold value or lower threshold value, as shown at step 808.

In at least one implementation, the controller/processor 540 may determine whether CQI clipping is occurring by determining that a distribution indicates a plurality of CQI values are received at the upper maximum (e.g., 30) or at the lower maximum (e.g., 1). In one or more other implementations, the controller/processor 540 may be adapted to determine whether the distribution of CQI values is at least substantially centered within a predetermined range of values (e.g., centered about the value 15 when the range is between 1 and 30).

At step 810, the network node can obtain a new measurement power offset in response to at least some of the plurality of received CQI values being outside of the lower or upper threshold value. For example, the controller/processor 540 may obtain a new measurement power offset by adjusting a previous measurement power offset by some amount if at least some of the plurality of received CQI values being outside of the lower or upper threshold value. In some implementations, the controller/processor 540 may be adapted to obtain a new measurement power offset by decreasing/increasing a previous measurement power offset by a predetermined amount when CQI values are reported at or outside of one of the lower or upper threshold values. In general, a previous measurement power offset can be decreased in response to at least some of the plurality of received CQI values being at or above the upper threshold, or the previous measurement power offset can be increased in response to at least some of the plurality of received CQI values being at or below the lower threshold. In other implementations, the controller/processor 540 can be adapted to obtain a new measurement power offset by decreasing/increasing a previous measurement power offset by an amount calculated to at least substantially center the CQI distribution within a predetermined range of CQI values.

At step 812, the new (or adjusted) measurement power offset is transmitted to one or more UEs in response to at least some of the plurality of received CQI values being at or above the upper threshold value, or at or below the lower threshold value. For example, the controller/processor 540 can transmit the new measurement power offset to one or more UEs via the transmit processor 520, the transmit frame processor 530 and the transmitter 532, as set forth herein above with reference to FIG. 5. In at least some implementations, the new measurement power offset can be sent as a RRC signaling, such as part of a transport channel reconfiguration procedure, a radio bearer reconfiguration procedure, or other RRC signaling. The same new measurement power offset may be transmitted to each of a plurality of UEs in some implementations, while a unique new measurement power offset may be transmitted to each of a plurality of UEs in other implementations.

Figure 9:
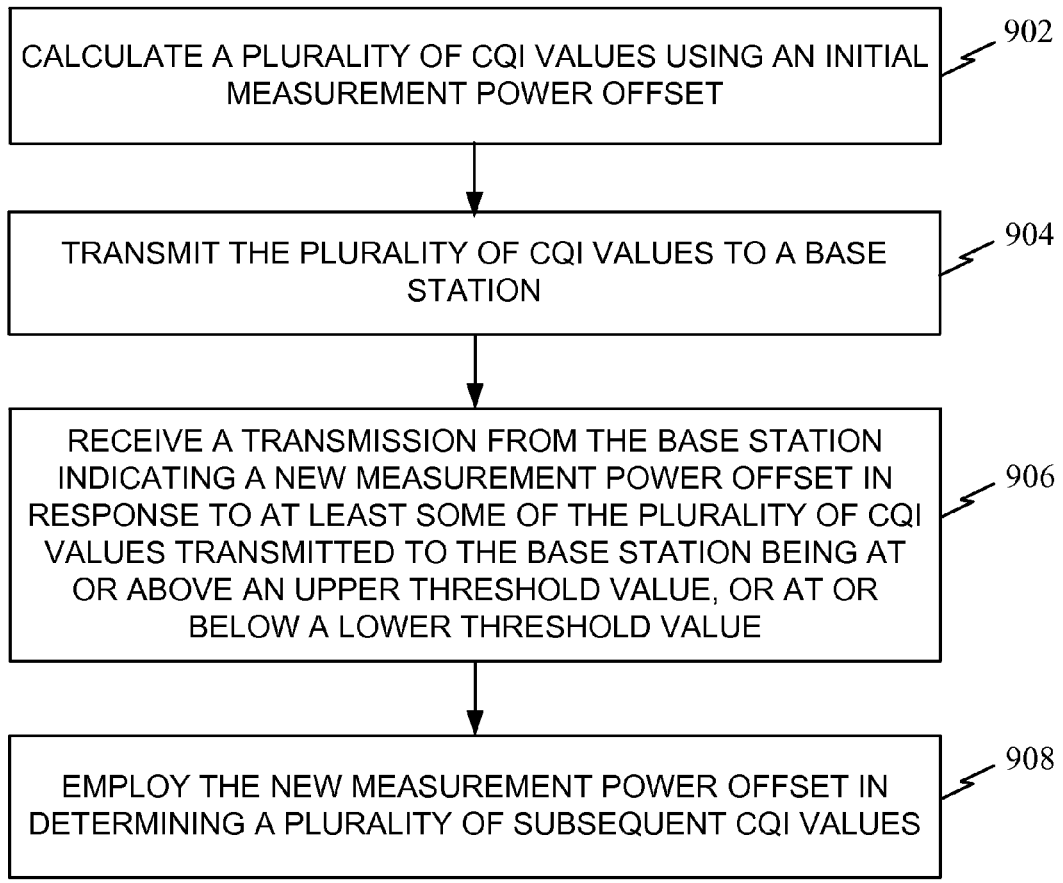
FIG. 9 is a flow diagram illustrating a method operational on a user equipment for facilitating measurement power offset adjustments in response to CQI values reported by the user equipment according to at least one implementation.

FIG. 9 is a flow diagram illustrating a method operational on a user equipment, such as UE 550, for facilitating measurement power offset adjustments in response to CQI values reported by the user equipment according to at least one implementation. With reference to both FIGS. 9 and 5, the UE can generate a plurality of channel quality indicators (CQIs) at step 902. For example, the controller/processor 590 of the UE 550 can calculate a plurality of CQI values according to the equation $P_{HSPDSCH} = P_{CPICH} + \Gamma + \Delta$ (dB), where $P_{CPICH}$ is typically the received power of the P-CPICH, $\Gamma$ is the initial measurement power offset, and $\Delta$ is the reference power adjustment given by tables included in the technical specification. As used herein, the initial measurement power offset is not limited to being the first measurement power offset. Instead, the initial measurement power offset represents the measurement power offset preceding the new measurement power offset described below. The calculated CQI values may typically fall somewhere in a range between 1 and 30.

At step 904, the UE 550 can transmit each of the plurality of CQI values to a base station, such as the base station 510. For example, the controller/processor 590 can wirelessly transmit the new measurement power offset to the base station 510 via the transmit processor 580, the transmit frame processor 582 and the transmitter 556, as described herein above with reference to FIG. 5.

The UE 550 may then receive a transmission indicating a new measurement power offset in response to at least some of the plurality of CQI values transmitted to the base station being outside one of an upper threshold value or a lower threshold value at step 906. For instance, the receiver 554 of the UE 550 can receive the wireless transmission from the base station 510 through the antenna 552, and can provide the recovered transmission data to the controller/processor 590 via the receive frame processor 560 and the receive processor 570, as described herein above with reference to FIG. 5. The new measurement power offset may have a lower value than the initial measurement power offset in response to at least some of the plurality of CQI values being at or above the upper threshold value, or a higher value than the initial measurement power offset in response to at least some of the plurality of CQI values being at or below the lower threshold.

At step 908, the UE can employ the new measurement power offset in determining a plurality of subsequent CQI values. For example, the controller/processor 590 may employ the new measurement power offset in the calculating subsequent CQI values according to the equation $P_{HSPDSCH} = P_{CPICH} + F + \Delta$ (dB). By employing the new measurement power offset, the UE can generate subsequent CQI values that may be more centered, and that may be free from clipping at the upper or lower boundaries of the CQI reporting range.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be implemented in systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
transmitting a plurality of channel quality indicator values to a base station for determining a distribution relating to the plurality of channel quality indicator values;
receiving a transmission from the base station providing a new measurement power offset based on the distribution in response to detecting at least a portion of the plurality of channel quality indicator values transmitted to the base station being clipped at or above an upper threshold value of a selected range, or being clipped at or below a lower threshold value of the selected range, the new measurement power offset adjusting a previous measurement power offset by an amount calculated to at least center the distribution of the plurality of channel quality indicator values within the selected range; and
employing the new measurement power offset in determining a plurality of subsequent channel quality indicator values.

2. The method of claim 1, further comprising:
calculating the plurality of channel quality indicator values using an initial measurement power offset.

3. The method of claim 1, wherein receiving the transmission from the base station providing the new measurement power offset comprises:
receiving the new measurement power offset which is lower than an initial measurement power offset employed to calculate the plurality of channel quality indicator values in response to at least a portion of the plurality of channel quality indicator values being at or above the upper threshold value.

4. The method of claim 1, wherein receiving the transmission from the base station providing the new measurement power offset comprises:
receiving the new measurement power offset which is higher than an initial measurement power offset employed to calculate the plurality of channel quality indicator values in response to at least a portion of the plurality of channel quality indicator values being at or below the lower threshold value.

5. An apparatus for wireless communication, comprising:
a transceiver adapted to facilitate wireless communication;
a memory; and
at least one processor coupled to the transceiver and to the memory, the at least one processor being adapted to:

transmit a plurality of channel quality indicator values to a base station via the transceiver for determining a distribution relating to the plurality of channel quality indicator values;

receive, via the transceiver, a transmission from the base station providing a new measurement power offset based on the distribution in response to detecting at least a portion of the plurality of channel quality indicator values transmitted to the base station being clipped at or above an upper threshold value of a selected range, or being clipped at or below a lower threshold value of the selected range, the new measurement power offset adjusting a previous measurement power offset by an amount calculated to at least center the distribution of the plurality of channel quality indicator values within the selected range; and employ the new measurement power offset in determining a plurality of subsequent channel quality indicator values.

6. The apparatus of claim 5, wherein the at least one processor is further adapted to:

calculate the plurality of channel quality indicator values using an initial measurement power offset.

7. The apparatus of claim 5, wherein the new measurement power offset is lower than an initial measurement power offset employed to calculate the plurality of channel quality indicator values in response to at least a portion of the plurality of channel quality indicator values being at or above the upper threshold value.

8. The apparatus of claim 5, wherein the new measurement power offset is higher than an initial measurement power offset employed to calculate the plurality of channel quality indicator values in response to at least a portion of the plurality of channel quality indicator values being at or below the lower threshold value.

9. An apparatus for wireless communication comprising:

means for transmitting a plurality of channel quality indicator values to a base station for determining a distribution relating to the plurality of channel quality indicator values;

means for receiving a transmission from the base station providing a new measurement power offset based on the distribution in response to detecting at least a portion of the plurality of channel quality indicator values transmitted to the base station being clipped at or above an upper threshold value of a selected range, or being clipped at or below a lower threshold value of the selected range, the new measurement power offset adjusting a previous measurement power offset by an amount calculated to at least center the distribution of the plurality of channel quality indicator values within the selected range; and means for employing the new measurement power offset in determining a plurality of subsequent channel quality indicator values.

10. The apparatus of claim 9, wherein the new measurement power offset is lower than an initial measurement power offset employed to calculate the plurality of channel quality indicator values in response to at least a portion of the plurality of channel quality indicator values being at or above the upper threshold value.

11. The apparatus of claim 9, wherein the new measurement power offset is higher than an initial measurement power offset employed to calculate the plurality of channel quality indicator values in response to at least a portion of the plurality of channel quality indicator values being at or below the lower threshold value.

12. A computer program product, comprising:

a non-transitory computer-readable medium comprising code for:

transmitting a plurality of channel quality indicator values to a base station for determining a distribution relating to the plurality of channel quality indicator values;

receiving a transmission from the base station providing a new measurement power offset based on the distribution in response to detecting at least a portion of the plurality of channel quality indicator values transmitted to the base station being clipped at or above an upper threshold value of a selected range, or being clipped at or below a lower threshold value of the selected range, the new measurement power offset adjusting a previous measurement power offset by an amount calculated to at least center the distribution of the plurality of channel quality indicator values within the selected range; and employing the new measurement power offset in determining a plurality of subsequent channel quality indicator values.

13. The computer program product of claim 12, wherein the new measurement power offset is lower than an initial measurement power offset employed to calculate the plurality of channel quality indicator values in response to at least a portion of the plurality of channel quality indicator values being at or above the upper threshold value.

14. The computer program product of claim 12, wherein the new measurement power offset is higher than an initial measurement power offset employed to calculate the plurality of channel quality indicator values in response to at least a portion of the plurality of channel quality indicator values being at or below the lower threshold value.

15. The computer program product of claim 12, wherein the computer-readable medium comprises code for wirelessly transmitting the plurality of channel quality indicator values to the base station.

16. The computer program product of claim 12, wherein the computer-readable medium comprises code for wirelessly receiving the transmission from the base station providing the new measurement power offset.

* * * * *